United States Patent
Hossen et al.

(10) Patent No.: US 11,744,271 B2
(45) Date of Patent: Sep. 5, 2023

(54) PROCESSED LEGUMINOUS MATERIALS

(71) Applicant: Kellogg Company, Battle Creek, MI (US)

(72) Inventors: Monjur Hossen, Battle Creek, MI (US); John David Pinkston, Battle Creek, MI (US); Alina Ruxandra Tenea, Kalamazoo, MI (US); George Cherian, Battle Creek, MI (US)

(73) Assignee: KELLOGG COMPANY, Battle Creek, MI (US)

( * ) Notice: Subject to any disclaimer, the term of this patent is extended or adjusted under 35 U.S.C. 154(b) by 482 days.

(21) Appl. No.: 16/023,253

(22) Filed: Jun. 29, 2018

(65) Prior Publication Data
US 2019/0000120 A1 Jan. 3, 2019

Related U.S. Application Data

(60) Provisional application No. 62/527,266, filed on Jun. 30, 2017.

(51) Int. Cl.
| | | |
|---|---|---|
| *A23L 11/30* | (2016.01) | |
| *A23L 11/00* | (2021.01) | |
| *A23J 3/14* | (2006.01) | |
| *A23J 1/14* | (2006.01) | |
| *A23L 29/225* | (2016.01) | |
| *C08B 30/04* | (2006.01) | |

(52) U.S. Cl.
CPC ............... *A23L 11/31* (2016.08); *A23J 1/14* (2013.01); *A23J 3/14* (2013.01); *A23L 11/01* (2016.08); *A23L 11/05* (2016.08); *A23L 29/225* (2016.08); *C08B 30/04* (2013.01); *A23V 2002/00* (2013.01)

(58) Field of Classification Search
CPC ........... A23L 11/01; A23L 11/05; A23L 11/31
See application file for complete search history.

(56) References Cited

U.S. PATENT DOCUMENTS

| | | | |
|---|---|---|---|
| 3,317,324 A | 5/1967 | Austin et al. | |
| 4,022,919 A * | 5/1977 | Comer | A23L 11/31 |
| | | | 426/511 |
| 4,476,148 A | 10/1984 | Harris | |

FOREIGN PATENT DOCUMENTS

| | | |
|---|---|---|
| GB | 2163938 | 3/1986 |
| WO | 2007149089 A1 | 12/2007 |
| WO | 2016120234 A1 | 8/2016 |

OTHER PUBLICATIONS

Heng, Lynn. "Flavour Aspects of Pea and its Protein Preparations in Relation to Novel Protein Foods", 2005; Retrieved from Internet URL: https://pdfs.semanticscholar.org/d8c5/e06d608d75b9ce0d7bc2a73019751bacd292.pdf?_ga=2.152115377.943493094.1582052627-1366204452.1582052627. (Year: 2005).*

(Continued)

*Primary Examiner* — Stephanie A Cox
(74) *Attorney, Agent, or Firm* — Honigman LLP

(57) ABSTRACT

Disclosed are methods of processing raw leguminous materials, such as pea flour, pea concentrate, or pea isolate, to reduce non-volatile flavor components and in particular bound saponin compounds. The methods includes select processing steps by steam cooking a raw slurry to form a cooked slurry and drying the cooked slurry to form a processed material. An amount of non-volatile flavor components in the processed material is less than an amount of non-volatile flavor components in the raw materials.

6 Claims, 2 Drawing Sheets

(56) References Cited

OTHER PUBLICATIONS

Heng, Lynn, Flavour Aspects of Pea and Its Protein Preparations in Relation to Novel Protein Foods, PhD Thesis, Wageningen University, Wageningen, The Netherlands, 2005.
PCT/US2018/040266 International Search Report dated Oct. 9, 2018.

* cited by examiner

PROCESSED LEGUMINOUS MATERIALS

CROSS REFERENCE TO RELATED APPLICATIONS

This application claims priority under 35 U.S.C. § 119(e) to U.S. Provisional Application 62/527,266 filed on Jun. 30, 2017. The disclosure of this prior application is considered part of the disclosure of this application and is hereby incorporated by reference in its entirety.

TECHNICAL FIELD

This disclosure relates to methods of processing raw leguminous materials to reduce non-volatile flavor components, processed leguminous compositions with reduced off-flavors, and food products prepared with such processed leguminous materials.

BACKGROUND

The statements in this section merely provide background information related to the present disclosure and may not constitute prior art.

Leguminous materials are attractive as alternative protein sources to replace soy products in foods and beverages. However, leguminous materials are often undesirable for use in food products because of their undesirable flavors. For instance, pea flour obtained from dry milling of peas contains pea flavors and a bitter taste. Consequently, when pea flour is used in food products, the flavor and bitter taste of raw peas is transferred to these products.

Attempts have been made to reduce the pea flavors and bitter taste in pea and other leguminous materials. However, such prior attempts, while providing some reduction in pea flavors and bitterness, have not been able to reduce these undesired characteristics to levels needed for broad consumer acceptance of pea flours in common foods and beverages.

SUMMARY OF THE DISCLOSURE

The present disclosure relates to processed leguminous materials, such as pea flours, pea protein isolates, pea protein concentrates, and combinations thereof, having a flavor that is not characteristic of the flavor of the raw materials before processing.

In one aspect, the present disclosure provides a method of processing a raw pea composition to reduce non-volatile flavor components, comprising: steam cooking a raw pea slurry to form a cooked pea slurry; and drying the cooked pea slurry to form a processed pea composition; wherein an amount of non-volatile flavor components associated with proteins having a molecular weight of about 25 kDa or greater in the processed composition is less than an amount of non-volatile flavor components in the raw materials. The proteins or protein structures may be associated with or may include strongly associated or even covalently bound saponins as discussed more herein. In some aspects, the processed flour has a reduced amount of bound saponins associated with compounds having a molecular weight of about 25 kDa or greater as compared to a raw pea composition, and may have up to about 95 percent reduction in the bound saponins as compared to the raw pea composition.

In another aspect, the present disclosure provides a method of processing a raw flour, comprising: hydrating the raw flour to form a raw flour slurry; steam cooking the raw flour slurry to form a cooked flour slurry; and drying the cooked flour slurry to form a processed flour; wherein the processed flour has substantially no off-flavor.

In another aspect, the present disclosure provides a method of processing a raw flour to reduce non-volatile flavor components, comprising: hydrating the raw flour to form a raw flour slurry; and separating, such as by filtration, a portion of bound saponins from the raw flour slurry to give a processed flour; wherein an amount of non-volatile flavor components in the processed flour is less than an amount of non-volatile flavor components in the raw flour.

In another aspect, the present disclosure provides a method of preparing a food product, comprising the steps of: providing a flour composition having a protein content that is substantially free of proteins having a molecular weight of greater than about 25 kDa; and combining the flour composition with one or more food ingredients to form the food product. The proteins may be strongly associated with or covalently bound to saponins.

In another aspect, the present disclosure provides a flour composition comprising: a protein content of less than about 60 percent by weight; and is substantially free of bound saponins associated with compounds having a molecular weight of greater than about 25 kDa; wherein the flour composition has substantially no off-organoleptic notes.

DETAILED DESCRIPTION

Figure 1:
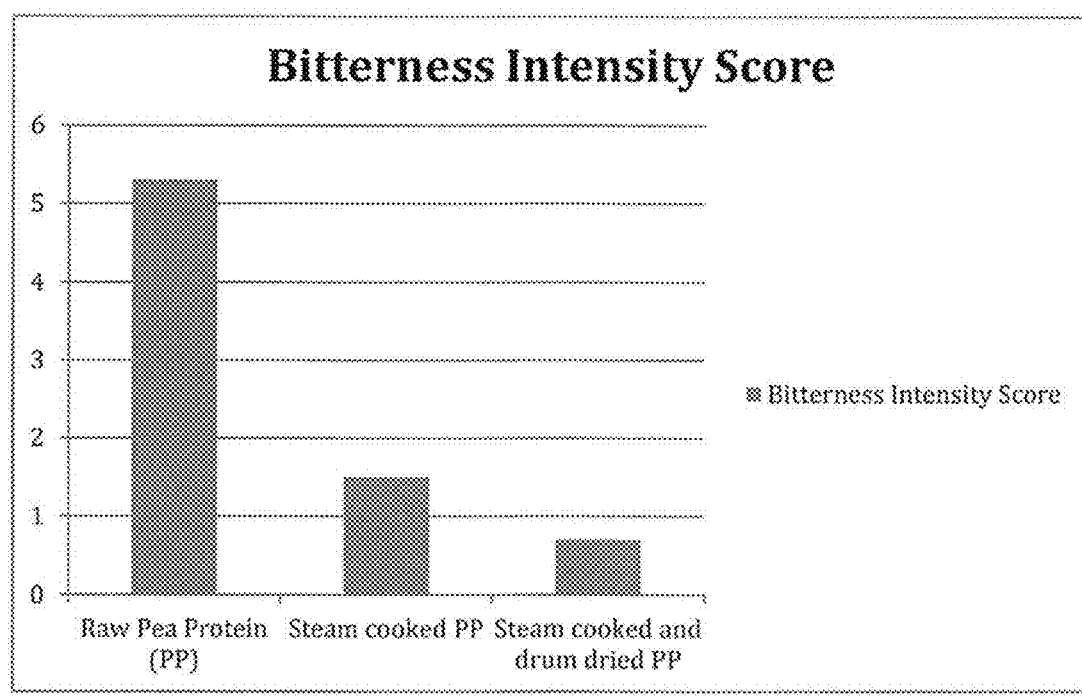
FIG. 1 is a graph showing the overall observed bitterness intensity score for raw pea protein, steam cooked pea protein, and steam cooked and drum dried pea protein.

While leguminous compositions, such as pea flour, pea protein concentrate, and pea protein isolate, are attractive as alternative protein sources to replace soy products or other ingredients in foods and beverages, leguminous compositions (and in particular pea flours or pea protein concentrates) are often undesirable for use in foods or beverages because of their undesirable flavors. As explained in the background, pea flours, concentrates, and isolates obtained from dry milling of peas typically contain undesired pea flavors and often a bitter taste. When attempting to substitute pea flour, concentrates, or isolates for soy or conventional flours in foods or beverages, the pea flavors and bitterness are noticeable and often contribute undesired organoleptic characteristics to the final food or beverage. Prior methods to remove these unwanted flavors and bitterness from pea compositions have not adequately removed enough of the undesired components to render pea compositions a viable substitute for soy or conventional flours in foods and beverages.

It has been long believed that low molecular weight, volatile components are responsible for the bitter and characteristic flavors of leguminous flours. Applicant has surprisingly found that the bitterness and characteristic flavors of pea compositions, for instance, can be improved further by decreasing amounts of certain non-volatile and high molecular weight components in the leguminous materials such as pea compositions. Without being bound by theory, it has been discovered that proteins associated with bound saponin compounds having a molecular mass of greater than about 25 kDa may be responsible for much of the bitterness and characteristic flavors in the pea flours, and removing or at least decreasing the amounts of these protein components and/or the associated bound saponin compounds from the pea compositions results in a processed pea composition (i.e., flour, concentrate, or isolate) with substantial reduced bitterness and characteristic pea flavors even if the saponin (and any associated proteins) remain as free and unbound in the processed pea composition.

More specifically, the present disclosure provides methods to reduce pea flavors and bitterness, and pea flour, concentrate, or isolate compositions having reduced pea flavors and bitterness, whereby the improvement is such that the pea compositions can be used similar to a soy or conventional flour or other protein additive in foods and beverages with little to no detectable pea flavor or bitterness in the final product. Pea flours and other pea compositions are known to contain saponin compounds and may contain from 0.7 to about 1.5 g/kg total saponin content (i.e., about 700 to about 1500 ppm). (See, e.g., Heng et al., J. Sci. Food Agr. 2006 (86) 1225-1231.) Saponins are glucosides that include a polycyclic aglycone attached to one or more sugar side chains. In some instances, the saponins may have or include the formula

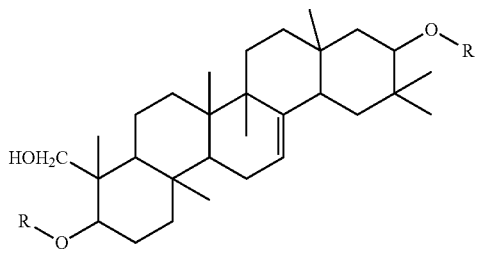

where at least one of the R groups is a sugar or an oligosaccharide chain. A wide variety of other structures may also be attached to the aglycone. It was discovered herein that a reduction of the bound or non-volatile saponins associated with certain molecular weight compounds from pea compositions using select processing steps and process conditions can reduce pea flavors and bitter tastes far beyond that previously obtainable with prior methods even if, unexpectedly, those bound saponin compounds still remain in the pea compositions in a free or unbound condition.

In some aspects, methods are provided to reduce bound saponin levels in pea compositions (such as pea flours and pea concentrates), and in particular, the bound saponins associated with proteins or compounds having a molecular mass of about 25 kDa or greater (in other cases, ranging in mass from about 25 kDa to about 55 kDa) by about 50 to about 95 percent as compared to un-processed pea compositions. In some aspects, the specific method steps involve steam cooking a raw pea slurry followed by drum drying with an optional flash drying step prior to the drum drying. In another aspect, the method involves filtering a raw pea slurry to remove the non-volatile or bound saponins associated with proteins or compounds of about 25 kDa or greater (in other instances, ranging in mass from about 25 kDa to about 55 kDa) followed by drum drying also with an optional flash drying step prior to the drum drying.

The deflavored or processed pea compositions herein include pea compositions made by the processes mentioned above and may include about 10 to about 1500 ppm of total saponin components, in other approaches, about 100 to about 1500 ppm total saponin components, in other approaches, about 100 to about 500 total saponin components, and in yet other approaches, about 300 to about 500 ppm total saponins or saponins associated with compounds having a molecular weight of about 25 kDa or greater. Other ranges within the above are also possible. The total saponin levels in the pea compositions include both free and bound saponin compounds. As discussed more below in the Examples, free saponins are compounds that can be removed from the pea compositions with a mild aqueous wash while bound saponins are compounds that require acid hydrolysis with hydrochloric acid to remove from the pea compositions. Saponins are a class of compounds that include many different types of compounds. While not wishing to be limited by theory, it is believed that the saponin content in legumes and pea proteins or pea compositions (flours, concentrates, or isolates) include a majority of soyasaponins and the rest of the saponin content is other types of saponins.

The processed pea compositions may further include about 10 to about 150 ppm of bound saponin content or bound saponins associated with compounds having a molecular weight of about 25 kDa or greater, in other approaches, about 20 to about 100 ppm of the bound saponin content, in yet other approaches, about 30 to about 100 ppm of the bound saponin content, and in yet other approaches, about 30 to about 50 ppm of the bound saponin. This level of bound saponin content represents about 50 to about 95 percent reduction as compared to the bound saponin content in an unprocessed raw pea composition (in other approaches, about a 60 to about a 95 percent reduction, in yet other approaches, about a 70 to about a 95 percent reduction, in yet other approaches, about a 80 to about a 95 percent reduction, and in yet further approaches, about a 90 to about 95 percent reduction).

In some approaches, the deflavored or processed pea compositions herein may also include about 100 to about 1400 ppm of free saponin content, in other approaches, about 200 to about 1000 ppm of the free saponin content, in yet other approaches, about 200 to about 600 ppm, in yet other approaches, about 200 to about 500 ppm, and in yet further approaches, about 300 to about 500 ppm content of the free saponin content or free saponins associated with compounding having a molecular weight great than about 25 kDa.

Prior to the present discoveries, different approaches attempted to reduce the bitterness and undesired flavors of beans and legumes, such as pea flours, concentrates, or isolates. For instance, alternative approaches included rotary cooking pea flour at different pressures (ranges from 2 to 17 psi for 20 to 60 minutes), dry roasting pea flour in a roasting chamber (400 to 550° F. for 15 second to 2 minutes), and static drying pea flour on a tray at 350 to 450° F. for 1 to 5 minutes. None of these methods resulted in pea flours with significant flavor and taste improvement as samples from these approaches only showed a very slight improvement in the bitter flavor notes consistent with prior methods and were not evaluated further. Without wishing to be limited by speculation, it is possible that such prior methods failed to reduce the level of bound saponins in the pea compositions as discovered by the methods and compositions herein.

As used herein, the term "legume" refers to the fruit or seed of leguminous plants. Non-limiting examples include alfalfa, clover, beans and peas (e.g., adzuki beans, broad beans, fava beans, bell beans, field beans, horsebeans, kidney beans, snap beans, chick peas, calvance peas, chestnut beans, dwarf peas, garbanzo beans, gram peas, yellow grams, cowpeas, asparagus beans, black eyed peas, black eyed beans, crowder peas, field peas, southern peas, frijoles, guar beans, cluster beans, hyacinth beans, bonavist, lablab, lima beans, butter beans, mung beans, dry peas, podded peas, snap peas, chicharo, lentils, lupins, peanuts, pigeon peas, soybeans, tepary beans, and vetch), mesquite, carob, and tamarind. In some preferred aspects, the legume is pea and a legume flour is pea flour.

As used herein, the term "raw flour" means a flour that has not been subjected to the methods as described herein.

As used herein, the term "flavor" means a quality that is detectable by taste and/or smell.

As used herein, the term "non-volatile flavor components" means molecules that provide flavor to a product, but are not volatile in the sense that they may not be removed by methods such as evaporation. The term applies to both liquids and solids.

As used herein, the term "processed flour" means a flour that has been subjected to the methods as described herein.

As used herein, the terms "off-flavor" and "off-flavors" mean an undesirable flavor, such as a bitter flavor or a characteristic flavor of the raw flour.

As used herein, the term "food product" includes crackers, breads (e.g., rye, wheat, oat, potato, white, whole grain products, mixed flours, loaves, twists, buns, rolls, pitas, matzos, focaccia, melba toast, zwieback, croutons, soft pretzels, soft and hard bread sticks, heat and serves), toaster pastries, cookies, Danish, croissant, tarts, pie crusts, pastries, muffins, brownies, sheet cakes, donuts, snack foods (e.g., pretzels, tortilla chips, corn chips, potato chips, fabricated snacks, fabricated potato crisps, extruded snacks, extruded filled snacks, trail mix, granola, snack mixes, shoe-string potatoes), flours, corn meal, polenta, mixes (e.g., cake mixes, biscuit mixes, brownie mixes, bread mixes, pancake mixes, crepe mixes, batter mixes, pizza dough), refrigerated doughs (e.g., biscuits, breads, bread sticks, croissants, dinner rolls, pizza dough, cookies, Danish, brownies, pie crust), frozen foods (e.g., pie crusts, pies, tarts, turnovers, pizzas, food pockets, cakes, French fries, hash browns, breaded products such as chicken and fish, breaded vegetables), bagels, breakfast cereals, biscuits, vegetables (e.g., dried, grilled, roasted, broiled, fried, vacuum dried), taco shells, hash browns, mashed potatoes, toast, grilled sandwiches, flour and corn tortillas, crepes, pancakes, waffles, batters, pizza crust, rice, herbs, spices, nuts, nut-based foods (e.g., peanut butter, foods containing chopped nuts), fruit (e.g., dried, grilled, roasted, broiled, fried, vacuum dried, baked, jellies, pie fillings, flambés, raisins), hush puppies, alcoholic beverages (e.g., beers and ales), products comprising roasted cocoa beans (e.g., cocoa, chocolates, confectionery coatings, hot chocolate, hot chocolate mixes, candy bars), and animal foods (e.g., dog food, cat food).

The term "food product" also includes a beverage or beverages. The beverage products disclosed herein include ready to drink liquid formulations, beverage concentrates, and the like. Beverages include, e.g., carbonated and non-carbonated soft drinks, fountain beverages, frozen ready-to-drink beverages, coffee beverages, tea beverages, dairy beverages, powdered soft drinks, purees, as well as liquid concentrates, flavored waters, enhanced waters, fruit juice and fruit juice-flavored drinks, sport drinks, and alcoholic products.

The terms "oil" and "fat" are used interchangeably herein to include any edible oil, fat, or shortening. The oil can be any edible oil or shortening, by way of example, any vegetable oil like canola oil, sunflower oil, soybean oil, corn oil, cottonseed oil, peanut oil, safflower oil, palm oil, coconut oil, rice bran oil, olive oil, and/or sesame oil. The oil can be any shortening based on these oils and/or any fractions of these oils.

The term "protein content" as used herein, refers to the relative protein content of a material as ascertained by A.O.C.S. (American Oil Chemists Society) Official Methods Bc 4-91 (1997), Aa 5-91 (1997), or Ba 4d-90 (1997), each incorporated herein in its entirety by reference, which determine the total nitrogen content of a material sample as ammonia, and the protein content as 6.25 times the total nitrogen content of the sample.

A pea or pea composition as used herein includes pea flours, pea protein concentrates, and pea protein isolates. Pea flours generally have 20 to about 30 percent protein, pea protein concentrates may include protein in amounts up to about 60 percent (in some instances, about 30 to about 60 percent and in other instances, about 40 to about 60 percent), and pea protein isolates may include protein in amounts up to about 90 weight percent (and in some instances, about 60 to about 90 percent and, in other instances, about 80 to about 90 percent).

Turning to more of the specifics and in one aspect, the present disclosure provides a method of processing legume compositions, such as pea compositions, to reduce undesired non-volatile flavor components, and in one approach, reduce bound saponins associated with compounds having a molecular weight greater than about 25 kDa. In some approaches, the methods include steam cooking a raw flour or concentrate slurry, such as raw pea flour slurry or a raw pea protein concentrate slurry, to form a cooked flour slurry/concentrate or cooked pea flour slurry/cooked pea protein concentrate. The cooked flour slurry or concentrate is then dried to form a processed flour or concentrate. The amount of non-volatile flavor components in the processed pea flour or concentrate is less than the amount of non-volatile flavor components in the raw unprocessed pea flour and, in some approaches, the amount of bound saponin compounds in the processed pea flour is reduced up to about 95 percent as compared to unprocessed pea flour (in other approaches, reductions of about 50 to about 95 percent, in yet other approaches, reductions of about 70 to about 95 percent, and in yet other approaches, reductions of about 80 to about 95 percent). Going forward, this disclosure will refer to methods of processing pea flour, but is expected to also apply to pea protein concentrates and, in some approaches, pea protein isolates.

In another aspect of the present disclosure, a method of processing raw flour, such as pea flour, is provided. The method includes hydrating the raw pea flour to form a raw pea flour slurry. The raw pea flour slurry is steam cooked to form a cooked pea flour slurry. The cooked pea flour slurry is subsequently dried to form a processed pea flour having the reduced levels of bound saponins noted above. The processed pea flour has substantially no off-flavor.

In one embodiment, the raw flour is a legume flour. Non-limiting examples of legume flours include flours that are derived from beans, chickpeas, cowpeas, fava beans, flat beans, geechee red peas, green beans, kidney beans, lentils, lupin beans, mung beans, peas, peanuts, snap peas, snow peas, soybeans, split peas, tamarind, wattleseed, and winged beans. In some embodiments, the raw flour includes one or more legume flours. Preferably, the legume flour includes or is pea flour.

Any suitable method of preparing legume flours from legumes (such as peas) may be used. The legume flour may be produced by milling a legume or legume product. In another embodiment, a dehydrated legume product may be used to form the legume flour, and be produced by milling a dehydrated legume or the dehydrated legume product into a flour. The dehydrated legume may be subjected to a form of crushing or pulverizing such as by passage of the dehydrated legume through a hammermill or universal mill.

In some embodiments, the raw flour is a legume flour such as pea flour. By way of example, pea flour may be prepared from dried peas that are first dehulled, cleaned, and ground to a fine flour. A typical composition of pea flour obtained from whole peas is about 20 to about 30 percent protein (preferably, about 26 percent protein), about 40 to about 50 percent starch (preferably, about 44 percent starch), and about 2 to about 15 percent fiber (preferably about 7 percent fiber) by weight. Suitable exemplary pea flours used in the present disclosure, therefore, have a protein content of about 26 percent by weight.

In other approaches, the raw flour or concentrates used herein has a protein content in an amount of less than about 60 percent by weight of the raw flour and typically include pea flours and pea protein concentrates. In some embodiments, the raw flour or concentrate has a protein content in an amount of less than about 55 percent, 50 percent, 45 percent, 40 percent, 35 percent, 30 percent, or 25 percent by weight based on the weight of the raw flour. In some embodiments, the raw flour or concentrate has a protein content in an amount of about 25 percent to about 60 percent, about 25 percent to about 55 percent, about 25 percent to about 50 percent, about 25 percent to about 45 percent, about 25 percent to about 40 percent, about 20 percent to about 40 percent, about 25 percent to about 35 percent, or about 25 percent to about 30 percent by weight based on the weight of the raw flour. In some embodiments, components of the raw flour are not separated, concentrated, or otherwise processed to increase protein content, for instance by preparing protein concentrate flours or protein isolate flours.

The legume flour slurry, such as pea flour slurry, is first cooked, such as by steam cooking. In some embodiments, the step of steam cooking is at a temperature of about 150° F. to about 300° F. In some embodiments, the step of steam cooking is at a temperature of about 150° F. to about 290° F., about 150° F. to about 280° F., about 150° F. to about 270° F., about 150° F. to about 260° F., about 150° F. to about 250° F., about 150° F. to about 240° F., about 150° F. to about 230° F., about 150° F. to about 220° F., about 150° F. to about 200° F., about 150° F. to about 190° F., about 150° F. to about 180° F., about 150° F. to about 170° F., or about 150° F. to about 160° F. In some embodiments, the step of steam cooking is at a temperature of less than about 300° F., less than about 290° F., less than about 280° F., less than about 270° F., less than about 260° F., less than about 250° F., less than about 240° F., less than about 230° F., less than about 220° F., less than about 210° F., less than about 200° F., less than about 190° F., less than about 180° F., less than about 170° F., less than about 160° F., or about 150° F.

In some embodiments, the step of steam cooking is for a time of about 30 seconds to about 10 minutes. In some embodiments, the step of steam cooking is for a time of about 30 seconds to about 9 minutes, about 30 seconds to about 8 minutes, about 30 seconds to about 7 minutes, about 30 seconds to about 6 minutes, about 30 seconds to about 5 minutes, about 30 seconds to about 4 minutes, about 30 seconds to about 3 minutes, about 30 seconds to about 2 minutes, about 30 seconds to about 90 seconds, about 30 seconds to about 60 seconds, or about 30 seconds to about 45 seconds. In some embodiments, the step of steam cooking is for a time of less than about 10 minutes, less than about 9 minutes, less than about 8 minutes, less than about 7 minutes, less than about 6 minutes, less than about 5 minutes, less than about 4 minutes, less than about 3 minutes, less than about 2 minutes, less than about 90 seconds, less than about 60 seconds, less than about 45 seconds, or about 30 seconds.

In some embodiments, the step of steam cooking is at a pressure of about 5 psi to about 25 psi. In some embodiments, the step of steam cooking is at a pressure of about 5 psi to about 20 psi, about 5 psi to about 15 psi, about 5 psi to about 10 psi, about 10 psi to about 20 psi, about 10 psi to about 25 psi, or about 15 psi to about 20 psi.

In some embodiments, the step of steam cooking comprises steam jet cooking. In some embodiments, the step of steam cooking comprises any suitable method of steam cooking, such as steam injection cooking.

After steam cooking the legume flour slurry, such as a pea flour slurry, the cooked pea flour slurry is then dried. In some embodiments, the step of drying is at a temperature of about 100° F. to about 250° F. In some embodiments, the step of drying is at a temperature of about 100° F. to about 240° F., about 100° F. to about 230° F., about 100° F. to about 220° F., about 100° F. to about 210° F., about 100° F. to about 200° F., about 100° F. to about 190° F., about 100° F. to about 180° F., about 100° F. to about 170° F., about 100° F. to about 160° F., about 100° F. to about 150° F., about 100° F. to about 140° F., about 100° F. to about 130° F., about 100° F. to about 110° F., or about 100° F. In some embodiments, the step of drying is at a temperature of less than about 250° F., less than about 240° F., less than about 230° F., less than about 220° F., less than about 210° F., less than about 200° F., less than about 190° F., less than about 180° F., less than about 170° F., less than about 160° F., less than about 150° F., less than about 140° F., less than about 130° F., less than about 120° F., less than about 110° F., or about 100° F.

In some embodiments, the step of drying is for a time of about 2 minutes to about 15 minutes. In some embodiments, the step of drying is for a time of about 2 minutes to about 14 minutes, about 2 minutes to about 13 minutes, about 2 minutes to about 12 minutes, about 2 minutes to about 11 minutes, about 2 minutes to about 10 minutes, about 2 minutes to about 9 minutes, about 2 minutes to about 8 minutes, about 2 minutes to about 7 minutes, about 2 minutes to about 6 minutes, about 2 minutes to about 5 minutes, about 2 minutes to about 4 minutes, or about 2 minutes to about 3 minutes. In some embodiments, the step of drying is for a time of less than about 15 minutes, less than about 14 minutes, less than about 13 minutes, less than about 12 minutes, less than about 11 minutes, less than about 10 minutes, less than about 9 minutes, less than about 8 minutes, less than about 7 minutes, less than about 6 minutes, less than about 5 minutes, less than about 4 minutes, or less than about 3 minutes.

In some embodiments, the step of drying comprises any suitable method. In some embodiments, the step of drying includes drum drying.

In other approaches, the cooked pea flour slurry is optionally flash cooled after the step of steam cooking and before the step of drying. Any suitable method of flash cooling may be used. In some embodiments, the flash cooling comprises flash evaporation of water using a pressure vessel such as a flash drum. In some embodiments, the flash cooling comprises spray drying.

In some embodiments, the raw (dry) legume flour, such as dry pea flour, is first hydrated with water to form the raw pea flour slurry prior to cooking. In some embodiments, the raw pea flour slurry comprises water and the raw pea flour in a ratio of about 2:1 to about 10:1. In some embodiments, the ratio of water to raw flour in the raw flour slurry is about 2:1 to about 9:1, about 2:1 to about 8:1, about 2:1 to about 7:1, about 2:1 to about 6:1, about 2:1 to about 5:1, about 2:1 to about 4:1, or about 2:1 to about 3:1. In some embodiments, the ratio of water to raw flour in the raw flour slurry is about 1:1, about 2:1, or about 3:1. In some embodiments, the raw flour slurry comprises a solids content of about 10 percent to about 20 percent by weight of the raw flour slurry. In some embodiments, the raw flour slurry comprises a solids content of about 10 percent to about 19 percent, about 10 percent to about 18 percent, about 10 percent to about 17 percent, about 10 percent to about 16 percent, about 10 percent to about 15 percent, about 10 percent to about 14 percent, about 10 percent to about 13 percent, about 10 percent to about 12 percent, about 10 percent to about 11 percent, or about 10 percent.

In aspects of the present disclosure, the amount of undesirable non-volatile flavor components in the processed pea flour is less than an amount of non-volatile flavor components in the raw pea flour. In some embodiments, the reduced non-volatile flavor components comprise bound saponins associated with compounds having a molecular weight of greater than about 25 kDa. In some embodiments, the reduced non-volatile flavor components comprise bound saponins associated with compounds having a molecular weight of about 25 kDa to about 50 kDa, about 30 kDa to about 40 kDa, about 30 kDa to about 35 kDa, about 35 kDa to about 50 kDa, about 40 kDa to about 50 kDa, or about 45 kDa to about 50 kDa. In some embodiments, the reduced non-volatile flavor components comprise proteins having a molecular weight of greater than about 25 kDa, greater than about 30 kDa. greater than about 35 kDa, greater than about 40 kDa, greater than about 45 kDa, or greater than about 50 kDa.

In other approaches, the amount of bound saponin components in the processed pea flour is about 10 percent, 20 percent, 30 percent, 40 percent, 50 percent, 60 percent, 70 percent, 80 percent, 90 percent, 95 percent, 98 percent, or 99 percent less than the amount of non-volatile or bound saponin compounds in the raw pea flour. In other embodiments, the amount of bound saponins associated with compounds having a molecular weight of greater than about 25 kDa in the processed flour is about 10 percent, 20 percent, 30 percent, 40 percent, 50 percent, 60 percent, 70 percent, 80 percent, 90 percent, 95 percent, 98 percent, or 99 percent less than the amount of saponins associated with compounds having a molecular weight of greater than about 25 kDa in the raw flour. As used herein, substantially free of generally means less than about 10 percent, less than about 5 percent, less than about 2 percent, less than about 1 percent, and in some approaches, none of the particular component, such as the non-volatile or bound saponin content or of a particular organoleptic characteristic.

In some embodiments, the processed pea flour is substantially free of bound saponins associated with compounds having a molecular weight of greater than about 25 kDa. In some embodiments, the processed flour is substantially free of bound saponins associated with compounds having a molecular weight of about 25 kDa to about 50 kDa, about 30 kDa to about 40 kDa, about 30 kDa to about 35 kDa, about 35 kDa to about 50 kDa, about 40 kDa to about 50 kDa, or about 45 kDa to about 50 kDa. In some embodiments, the processed flour is substantially free of bound saponins associated with compounds having a molecular weight of greater than about 50 kDa, greater than about 45 kDa, greater than about 40 kDa, or greater than about 35 kDa.

In some embodiments, the processed pea flour has substantially no bitter flavor and/or substantially no pea flavors. Sensory analysis can be used to evaluate and establish the presence of a bitter flavor. Any appropriate method of sensory analysis that is common to the art can be used. Non-limiting examples include flavor profile analysis, quantitative descriptive analysis, spectrum analysis, time-intensity descriptive analysis, free choice profiling, and the like. Analytical methods can also be used to evaluate the presence of bitter flavor.

According to another aspect of the present disclosure, a method of processing raw pea flour to reduce non-volatile flavor components, such as bound saponin, is provided. The method includes hydrating the raw pea flour to form a raw pea flour slurry. A portion of bound saponin compounds may then be separated, such as by filtration, from the raw pea flour slurry to give processed pea flour slurry that may be further processed by drying and the like. An amount of non-volatile flavor components in the processed flour and the processed flour slurry is less than an amount of non-volatile flavor components in the raw flour and the raw flour slurry consistent to the discussion above In some embodiments, the step of separation includes any method that is sufficient to decrease the amount of bound saponin components in the processed pea flour relative to the amount of bound saponin components in the raw pea flour. In some embodiments, the step of separation comprises filtration sufficient to remove bound saponins associated with compounds having a molecular weight of about 25 kDa or greater. Any suitable method of filtration may be used. In other approaches, the step of separation comprises ultrafiltration. Any suitable method of ultrafiltration may be used. In other embodiments, separation may also include removal of bound saponin components through enzymatic cleavage or decoupling, denaturation, use of affinity ligands or electrophoretic charge separation.

In another aspect, a method of preparing a food product including a flour, such as the pea flour as described herein, is provided. The method comprises providing a flour composition having a bound saponin content that has reduced levels or is substantially free of bound saponins (as discussed above) having a molecular weight of greater than about 25 kDa. The flour composition is then combined with one or more food ingredients to form the food product. In some embodiments, the food product has substantially no off-flavors attributable to the flour composition. In some embodiments, the food product is a beverage.

In some embodiments, the step of decreasing the amount of bound saponin compounds from the raw flour comprises steam cooking a raw flour slurry to form a cooked flour slurry and then drying the cooked flour slurry to form the flour composition. In some embodiments, the step of decreasing the amount of bound saponin compounds from the raw flour comprises separating, at least by filtration, at least a portion of the bound saponins from a raw flour to give the flour composition.

In a further aspect of the present disclosure, a flour composition is provided. In some aspects, the flour composition is a pea flour composition. The flour composition includes a protein content in an amount of less than about 60 percent by weight based on the weight of the flour composition. The protein is substantially free of or has a reduced level of saponin associated with compounds having a molecular weight of greater than about 25 kDa. The flour composition has substantially no off-flavor.

In still another aspect of the present disclosure, a food product is provided. The food product includes a flour composition prepared according to any method as described herein.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient or effective to reduce the amount of non-volatile flavor components, such as bound saponins associated with compounds having a molecular weight greater than 25 kDa in a raw flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the raw flour is a legume flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is a legume flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the raw flour is a legume flour and has a protein content in an amount of less than about 60 percent by weight of the raw flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient and effective to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is a legume flour and has a protein content in an amount of less than about 60 percent by weight of the raw flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient and effective to reduce the amount of non-volatile flavor components in a raw flour. In some embodiments, the raw flour is a legume flour and has a protein content in an amount of about 15 percent to about 60 percent by weight of the raw flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is a legume flour and has a protein content in an amount of about 15 percent to about 60 percent by weight of the raw flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the raw flour is pea flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is pea flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the raw flour is pea flour and has a protein content in an amount of less than about 60 percent by weight of the pea flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is pea flour and has a protein content in an amount of less than about 60 percent by weight of the pea flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the raw flour is pea flour and has a protein content in an amount of about 15 percent to about 60 percent by weight of the pea flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is pea flour and has a protein content in an amount of about 15 percent to about 60 percent by weight of the pea flour.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the non-volatile flavor components comprise one or more proteins with a molecular weight of greater than about 25 kDa. As used herein and throughout this disclosure, proteins or the protein structures may be associated with or may include strongly associated or covalently bound saponins.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the non-volatile flavor components comprise one or more proteins with a molecular weight of greater than about 25 kDa. In some embodiments, the processed flour is substantially free of proteins having a molecular weight of greater than about 25 kDa.

In some embodiments, the method of processing a raw flour to reduce non-volatile flavor components comprises steam jet cooking a raw flour slurry and drum drying the cooked flour slurry. In some embodiments, the raw flour slurry comprises water and the raw flour in a ratio of about 2:1 to about 10:1.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour slurry comprises water and the raw flour in a ratio of about 2:1 to about 10:1.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour slurry comprises water and the raw flour in a ratio of about 2:1 to about 10:1. In some embodiments, the raw flour is a legume flour and has a protein content in an amount of about 25 percent to about 40 percent by weight of the legume flour. In some embodiments, the processed flour is substantially free of proteins having a molecular weight of greater than about 25 kDa.

In some embodiments, the method of processing a raw flour to reduce non-volatile flavor components comprises steam jet cooking a raw flour slurry and drum drying the cooked flour slurry. In some embodiments, the step of steam jet cooking and the step of drum drying are each at a temperature and each for an amount of time sufficient to reduce the amount of non-volatile flavor components in a raw flour. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour slurry comprises water and the raw flour in a ratio of about 2:1 to about 10:1. In some embodiments, the raw flour is pea flour and has a protein content in an amount of about 25 percent to about 40 percent by weight of the pea flour. In some embodiments, the processed flour is substantially free of proteins having a molecular weight of greater than about 25 kDa.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the raw flour is a legume flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is a legume flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the raw flour is a legume flour and has a protein content in an amount of less than about 60 percent by weight of the raw flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is a legume flour and has a protein content in an amount of less than about 60 percent by weight of the raw flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the raw flour is a legume flour and has a protein content in an amount of about 15 percent to about 60 percent by weight of the raw flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is a legume flour and has a protein content in an amount of about 25 percent to about 40 percent by weight of the raw flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the raw flour is pea flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is pea flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the raw flour is pea flour and has a protein content in an amount of less than about 60 percent by weight of the pea flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is pea flour and has a protein content in an amount of less than about 60 percent by weight of the pea flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the raw flour is pea flour and has a protein content in an amount of about 15 percent to about 60 percent by weight of the pea flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour is pea flour and has a protein content in an amount of about 15 percent to about 60 percent by weight of the pea flour.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour slurry comprises water and the raw flour in a ratio of about 2:1 to about 10:1.

In some embodiments, the method of processing a raw flour comprises steam jet cooking a raw flour slurry and drum drying the cooked flour slurry. In some embodiments, the step of steam jet cooking and the step of drum drying are each at a temperature and each for an amount of time sufficient to obtain a processed flour with substantially no off-flavor. In some embodiments, the step of steam jet cooking is at a temperature of about 150° F. to about 300° F. and the step of drum drying is at a temperature of about 100° F. to about 250° F. In some embodiments, the step of steam jet cooking is for a time of about 30 seconds to 10 minutes and the step of drum drying is for a time of about 2 minutes to about 15 minutes. In some embodiments, the raw flour slurry comprises water and the raw flour in a ratio of about 2:1 to about 10:1. In some embodiments, the raw flour is a legume flour and has a protein content in an amount of about 15 percent to about 60 percent by weight of the legume flour.

In some embodiments, the method of processing a raw flour to reduce non-volatile flavor components comprises hydrating the raw flour to form a raw flour slurry and separating a portion of the proteins from the raw flour slurry to give a processed flour, wherein an amount of non-volatile flavor components in the processed flour is less than an amount of non-volatile flavor components in the raw flour. In some embodiments, the raw flour is a legume flour.

In some embodiments, the method of processing a raw flour to reduce non-volatile flavor components comprises hydrating the raw flour to form a raw flour slurry and separating a portion of the proteins from the raw flour slurry to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour.

In some embodiments, the method of processing a raw flour to reduce non-volatile flavor components comprises hydrating the raw flour to form a raw flour slurry and separating a portion of the proteins from the raw flour slurry to give a processed flour, wherein an amount of non-volatile flavor components in the processed flour is less than an amount of non-volatile flavor components in the raw flour. In some embodiments, the raw flour is pea flour.

In some embodiments, the method of processing a raw flour to reduce non-volatile flavor components comprises hydrating the raw flour to form a raw flour slurry and separating a portion of the proteins from the raw flour slurry to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour.

In some embodiments, the method of processing a raw flour to reduce non-volatile flavor components comprises hydrating the raw flour to form a raw flour slurry and separating a portion of the proteins from the raw flour slurry to give a processed flour, wherein an amount of non-volatile flavor components in the processed flour is less than an amount of non-volatile flavor components in the raw flour. In some embodiments, the raw flour is a legume flour. In some embodiments, the processed flour is substantially free of proteins having a molecular weight of greater than about 25 kDa.

In some embodiments, the method of processing a raw flour to reduce non-volatile flavor components comprises hydrating the raw flour to form a raw flour slurry and separating a portion of the proteins from the raw flour slurry by filtration to give a processed flour, wherein an amount of non-volatile flavor components in the processed flour is less than an amount of non-volatile flavor components in the raw flour.

In some embodiments, the method of processing a raw flour to reduce non-volatile flavor components comprises hydrating the raw flour to form a raw flour slurry and separating a portion of the proteins from the raw flour slurry by filtration to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour.

In some embodiments, the method of processing a raw flour to reduce non-volatile flavor components comprises hydrating the raw flour to form a raw flour slurry and separating a portion of the proteins from the raw flour slurry by filtration to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour.

In some embodiments, the method of processing a raw flour to reduce non-volatile flavor components comprises hydrating the raw flour to form a raw flour slurry and separating a portion of the proteins from the raw flour slurry by filtration to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour. In some embodiments, the processed flour is substantially free of proteins having a molecular weight of greater than about 25 kDa.

In some embodiments, the method of processing a raw flour to reduce non-volatile flavor components comprises hydrating the raw flour to form a raw flour slurry and separating a portion of the proteins from the raw flour slurry by filtration to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour. In some embodiments, the processed flour is substantially free of proteins having a molecular weight of greater than about 25 kDa.

In some embodiments, the method of processing a raw flour to reduce non-volatile flavor components comprises hydrating the raw flour to form a raw flour slurry and separating a portion of the proteins from the raw flour slurry by size exclusion chromatography to give a processed flour, wherein an amount of non-volatile flavor components in the processed flour is less than an amount of non-volatile flavor components in the raw flour.

In some embodiments, the method of processing a raw flour to reduce non-volatile flavor components comprises hydrating the raw flour to form a raw flour slurry and separating a portion of the proteins from the raw flour slurry by size exclusion chromatography to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour.

In some embodiments, the method of processing a raw flour to reduce non-volatile flavor components comprises hydrating the raw flour to form a raw flour slurry and separating a portion of the proteins from the raw flour slurry by size exclusion chromatography to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour.

In some embodiments, the method of processing a raw flour to reduce non-volatile flavor components comprises hydrating the raw flour to form a raw flour slurry and separating a portion of the proteins from the raw flour slurry by size exclusion chromatography to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour. In some embodiments, the processed flour is substantially free of proteins having a molecular weight of greater than about 25 kDa.

In some embodiments, the method of processing a raw flour to reduce non-volatile flavor components comprises hydrating the raw flour to form a raw flour slurry and separating a portion of the proteins from the raw flour slurry by size exclusion chromatography to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour. In some embodiments, the processed flour is substantially free of proteins having a molecular weight of greater than about 25 kDa.

In some embodiments, the method of processing a raw flour to reduce non-volatile flavor components comprises hydrating the raw flour to form a raw flour slurry and separating a portion of the proteins from the raw flour slurry by gel filtration chromatography to give a processed flour, wherein an amount of non-volatile flavor components in the processed flour is less than an amount of non-volatile flavor components in the raw flour.

In some embodiments, the method of processing a raw flour to reduce non-volatile flavor components comprises hydrating the raw flour to form a raw flour slurry and separating a portion of the proteins from the raw flour slurry by gel filtration chromatography to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour.

In some embodiments, the method of processing a raw flour to reduce non-volatile flavor components comprises hydrating the raw flour to form a raw flour slurry and separating a portion of the proteins from the raw flour slurry by gel filtration chromatography to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour.

In some embodiments, the method of processing a raw flour to reduce non-volatile flavor components comprises hydrating the raw flour to form a raw flour slurry and separating a portion of the proteins from the raw flour slurry by gel filtration chromatography to give a processed flour, wherein an amount of non-volatile flavor components in the processed flour is less than an amount of non-volatile flavor components in the raw flour. In some embodiments, the raw flour is a legume flour and has a protein content of less than about 60 percent by weight of the legume flour. In some embodiments, the processed flour is substantially free of proteins having a molecular weight of greater than about 25 kDa.

In some embodiments, the method of processing a raw flour to reduce non-volatile flavor components comprises hydrating the raw flour to form a raw flour slurry and separating a portion of the proteins from the raw flour slurry by gel filtration chromatography to give a processed flour, wherein an amount of non-volatile flavor components in the processed flour is less than an amount of non-volatile flavor components in the raw flour. In some embodiments, the raw flour is pea flour and has a protein content of less than about 60 percent by weight of the pea flour. In some embodiments, the processed flour is substantially free of proteins having a molecular weight of greater than about 25 kDa.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the flour composition comprises a legume flour and has a protein content of less than about 60 percent by weight of the flour composition.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the flour composition comprises pea flour and has a protein content of less than about 60 percent by weight of the flour composition.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the step of decreasing the amount of a fraction of proteins comprises steam cooking a raw flour slurry to form a cooked flour slurry and drying the cooked flour slurry to form the flour composition.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the step of decreasing the amount of a fraction of proteins comprises steam cooking a raw flour slurry to form a cooked flour slurry and drying the cooked flour slurry to form the flour composition. In some embodiments, the step of steam cooking is at a temperature of about 150° F. to about 300° F. In some embodiments, the step of steam cooking is for a time of about 30 seconds to about 10 minutes. In some embodiments, the step of steam cooking is at a pressure of about 5 psi to about 25 psi.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the step of decreasing the amount of a fraction of proteins comprises steam cooking a raw flour slurry to form a cooked flour slurry and drying the cooked flour slurry to form the flour composition. In some embodiments, the step of steam cooking is at a temperature of about 150° F. to about 300° F. In some embodiments, the step of steam cooking is for a time of about 30 seconds to about 10 minutes. In some embodiments, the step of steam cooking is at a pressure of about 5 psi to about 25 psi. In some embodiments, the step of drying is for a time of about 2 minutes to about 15 minutes.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the step of decreasing the amount of a fraction of proteins comprises steam cooking a raw flour slurry to form a cooked flour slurry and drying the cooked flour slurry to form the flour composition. In some embodiments, the step of steam cooking is at a temperature of about 150° F. to about 300° F. In some embodiments, the step of steam cooking is for a time of about 30 seconds to about 10 minutes. In some embodiments, the step of steam cooking is at a pressure of about 5 psi to about 25 psi. In some embodiments, the step of drying is for a time of about 2 minutes to about 15 minutes. In some embodiments, the step of steam cooking comprises steam jet cooking and the step of drying comprises drum drying.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the step of separation comprises filtration.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the step of separation comprises size exclusion chromatography.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the step of separation comprises gel filtration chromatography.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the food product is a beverage.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the step of separation comprises filtration. In some embodiments, the food product is a beverage.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the step of separation comprises size exclusion chromatography. In some embodiments, the food product is a beverage.

In some embodiments, the method of preparing a food product comprises the steps of providing a flour composition having a protein content that is substantially free of proteins having a molecular weight of greater than about 25 kDa and combining the flour composition with one or more food ingredients to form the food product. In some embodiments, the method further comprises the step of decreasing an amount of a fraction of proteins from a raw flour to give the flour composition. In some embodiments, the method of decreasing the amount of a fraction of proteins comprises separating the portion of proteins from a raw flour to give the flour composition. In some embodiments, the step of separation comprises gel filtration chromatography. In some embodiments, the food product is a beverage.

In some embodiments, a flour composition is provided and comprises a protein content in an amount of less than about 55 percent by weight, a molecular weight distribution profile that is substantially free of proteins having a molecular weight of greater than about 25 kDa, and wherein the flour composition has substantially no flavor. In some embodiments, the flour is a legume flour.

In some embodiments, a flour composition is provided and comprises a protein content in an amount of less than about 55 percent by weight, a molecular weight distribution profile that is substantially free of proteins having a molecular weight of greater than about 25 kDa, and wherein the flour composition has substantially no flavor. In some embodiments, the flour is pea flour.

In some embodiments, a flour composition is provided and comprises a protein content in an amount of about 25 percent to about 40 percent by weight, a molecular weight distribution profile that is substantially free of proteins having a molecular weight of greater than about 25 kDa, and wherein the flour composition has substantially no flavor. In some embodiments, the flour is a legume flour.

In some embodiments, a flour composition is provided and comprises a protein content in an amount of about 25 percent to about 40 percent by weight, a molecular weight distribution profile that is substantially free of proteins having a molecular weight of greater than 28068247.1 about 25 kDa, and wherein the flour composition has substantially no flavor. In some embodiments, the flour is pea flour.

In some embodiments, a flour composition is provided and comprises a protein content in an amount of less than about 55 percent by weight, a molecular weight distribution profile that is substantially free of proteins having a molecular weight of greater than about 25 kDa, and wherein the flour composition has substantially no flavor. In some embodiments, the flour is a legume flour. In some embodiments, the flour composition has substantially no bitter flavor.

In some embodiments, a flour composition is provided and comprises a protein content in an amount of less than about 55 percent by weight, a molecular weight distribution profile that is substantially free of proteins having a molecular weight of greater than about 25 kDa, and wherein the flour composition has substantially no flavor. In some embodiments, the flour is pea flour. In some embodiments, the flour composition has substantially no bitter flavor.

In some embodiments, the food product includes an ingredient such as a fat, an oil, a salt, or a flavoring. In some embodiments, the food product may include one or more fats, one or more oils, one or more salts, and/or one or more flavorings. In some embodiments, the food product includes oil in an amount of about 1 percent to about 10 percent, about 2 percent to about 10 percent, about 2 percent to about 8 percent, about 2 percent to about 5 percent, or about 2 percent to about 4 percent based on the total weight of the food product. In certain embodiments, the food product includes salt in an amount of about 0.1 percent to about 2 percent, about 0.2 percent to about 2 percent, about 0.5 percent to about 2 percent, about 0.1 percent to about 1 percent, or about 0.5 percent to about 1 percent by weight based on the total weight of the food product. In some embodiments, food product includes flavoring in an amount of about 0.1 percent to about 1 percent, about 0.25 percent to about 1 percent, about 0.5 percent to about 1 percent, or about 0.1 percent to about 0.5 percent by weight based on the total weight of the food product. In some embodiments, the binder composition includes an antioxidant in an amount of about 0.01 percent to about 0.2 percent, about 0.05 percent to about 0.2 percent, about 0.1 percent to about 0.2 percent, about 0.01 percent to about 0.1 percent, about 0.02 percent to about 0.1 percent, or about 0.05 percent to about 0.1 percent by weight based on the total weight of the binder composition.

The food product may also include a variety of additives or inclusions. Additives or inclusions can include combinations of, by way of non-limiting examples: fruit pieces, preferably dried; fruit juice concentrates; fruit purees; vegetable pieces; nuts or nut meats; seeds; legumes, preferably dried; raisins; carob or chocolate chips; yogurt chips; compound coating chips; white chocolate; coconut flakes; broken ready to eat cereal pieces (as non-limiting examples, rice bubbles or DX crisps); toffee; pretzel pieces; cheese pieces, preferably dried or crumbled; meat pieces, preferably dried (e.g., bacon bits), and other food pieces for flavor and novelty. The additives can also include sources of fiber such as inulin, fructo-oligosaccharides, galacto-oligosaccharides, corn fiber, and wheat fiber. The additives can include additional protein such as protein flakes, protein nuggets, protein concentrates, and protein isolates from any sources including soy, whey, milk, egg, pea, and legume. The additives can include hydrocolloids such as xanthan gum, guar gum, locust bean gum, acacia gum, alginates, and carrageenans. The additives can include cellulosics such as microcrystalline cellulose, methylcellulose, ethyl cellulose, carboxymethylcellulose, and hydroxyl propyl methylcellulose.

The food product may also include one or more carbohydrates. Carbohydrates used for the current disclosure may constitute about 1 percent to about 90 percent, about 1 percent to about 80 percent, about 1 percent to about 75 percent, about 1 percent to about 50 percent, about 1 percent to about 25 percent, about 5 percent to about 20 percent, or about 8 percent to about 18 percent by weight based on the total weight of the food product. Suitable carbohydrates include, but are not limited to, wheat flour, flour, dextrin, maltodextrin, carboxymethylcellulose (CMC), methylcellulose, hydroxypropylmethylcellulose (HPMC), guar gum, locust bean gum, xanthan gum, carrageenan, algins, levan, elsinan, pullulan, pectins, chitosan, and gum arabic; native starches such as corn starch, waxy maize starch, high-amylose corn starch, potato, tapioca, rice and wheat starch, modified starches such as those that have been acid modified, bleached, oxidized, esterified, etherified, and combinations thereof.

An optional emulsifier can be included in the food product. Suitable emulsifiers include, by way of example only, lecithin, diacetyl tartaric ester of monoglyceride (DATEM), mono- and di-glycerides, and sodium stearoyl lactylate. In some embodiments, the emulsifier is present in an amount of 0 to about 0.5 percent, about 0.05 percent to about 0.5 percent, or about 0.1 percent to about 0.4 percent by weight based on the total weight of the food product. The high intensity sweetener, including but not limited to stevia, Monk Fruit Extract, and sucralose may be added to enhance flavor. In some embodiments, flavor modifies such as Sweet-GEM or TasteGEM may also be used to enhance flavor. In some embodiments, the high intensity sweeteners may be included in an amount of about 0.01 to about 0.1 percent by weight based on the total weight of the food product.

An optional starch may be used for the current disclosure, and is obtained from a source selected from the group of native leguminous starch, native cereal starch, native root starch, native tuber starch, native fruit starch, native algae starch, modified leguminous starch, modified cereal starch, modified root starch, modified tuber starch, modified fruit starch, modified algae starch, waxy type starches, or mixtures thereof. Typical sources for the starch are cereals, tubers, roots, legumes, fruit, algae, and hybrid starches. Suitable sources include but are not limited to wheat, corn, pea, potato, sweet potato, sorghum, banana, barley, rice, sago, amaranth, tapioca, arrowroot, and cane.

Colorants or coloring agents used for the current disclosure can be used in any suitable amount to produce a desired color. Further, the food products of the present disclosure may have multi-colored patterns and/or other related designs or shapes to produce color contrasts. Coloring agents can include, for example, natural food colors and dyes suitable for food, drug, and cosmetic applications. The colorants are typically known as FD&C dyes and lakes such as FD&C Blue No. 1, FD&C Blue No. 2, FD&C Green No. 3, FD&C Yellow No. 5, FD&C Yellow No. 6, FD&C Red No. 3, FD&C Red No. 33, FD&C Red No. 40, and combinations thereof. The coloring agents may constitute about 0.01 percent to about 2 percent by weight based on the total weight of the food product.

Preservatives used for the current disclosure may be employed to ensure the safety and quality of the food product. Suitable preservatives include, but are not limited to, sorbic acid, sodium benzoate, potassium sorbate, methyl p-hydroxybenzoate, sodium propionate, and propyl p-hydroxybenzoate alone or in any combination. In addition, suitable antioxidants, for instance BHT, BHA, TBHQ, rosemary extract, mixed tocopherols, and green tea extract, can also be utilized. Preservatives or the antioxidants may be present in an amount of about 0.01 percent to about 1 percent by weight based on the total weight of the food product.

Nutritional or supplemental additives used for the current disclosure include ingredients such as vitamins, antioxidants, minerals, trace elements, fibers, and mixtures thereof. The vitamins may include vitamin A, B1 (thiamin), B2 (riboflavin), B6, B12, C, D, E and/or derivative thereof, niacin, folic acid, biotin, and pantothenic acid in a nutritionally acceptable form and amount. Examples of mineral and trace elements include calcium, iron, phosphorous, iodine, magnesium, manganese, zinc, copper, sodium, choline, potassium, selenium, and chromium in a nutritionally acceptable form and amount. Suitable antioxidants include alpha-tocopherol, citric acid, butylated hydroxytoluene, butylated hydroxyanisole, ascorbic acid, fumaric acid, malic acid, sodium ascorbate, and ascorbic acid palmitate in a nutritionally acceptable form and amount.

EXAMPLES

Advantages and embodiments of the methods and compositions described herein are further illustrated by the following examples; however, the particular conditions, processing schemes, materials, and amounts thereof recited in these examples, as well as other conditions and details, should not be construed to unduly limit this method. All percentages and ratios in these Examples and throughout this disclosure are by weight unless otherwise indicated.

Testing Protocols

Unless otherwise specified, in the examples below, all parameters are measured as defined in this section. The measurement of the parameters as defined in this section also represents methods for measuring these parameters according to the disclosure as indicated in the respective aspects and embodiments of the above detailed description.

Example 1

In accordance with some embodiments, a processed pea flour was prepared with the steps comprising:
1. 200 gallons of soft water were added to a tank. The water was recirculated through high shear mixer.
2. 550 pounds of pea flour was loaded into the high shear mixer.
3. The pea flour was then transferred to the tank.
4. A jet cooker pump was set at 2.0 gpm.
5. The cooking temperature was set at 290° F. The system was set to maintain 55 to 60 psig backpressure and 130 psig in the steam header. The backpressure was increased if the cooking temperature could not be maintained.
6. The cooked slurry was sent to a feed tank under agitation. The feed tank was maintained at a temperature of greater than 180° F.
7. The cooked slurry was sent from the feed tank to a roll dryer operated with the following parameters: percent Flow Speed PD Pump to the Dryer=35 percent to 40 percent, Roller Gap=0.008", Pond Level=Low, about 1 inch, Steam Pressure=90 psig, Roll Speed=70 percent, Roll Temperature=270° F. to 280° F.

Example 2

In accordance with some embodiments, a food product was prepared using the pea flour from Example 1 and comprised or can comprise the following ingredients:

TABLE 1

| Ingredients | Example % | Broader Exemplary Ranges of Weight Proportions, % | Narrower Exemplary Range of Weight Proportions, % |
|---|---|---|---|
| Dry Ingredient | | | |
| One or more grains | 47 | 30-90 | 40-60 |
| Seeds | 6 | 10-35 | 20-30 |
| Dried flavors | 18 | 10-35 | 20-30 |
| Processed pea flour* | 21 | 65-90 | 75-90 |
| Spices | 4 | 0-12 | 5-10 |
| Syrup Mix | | | |
| Acacia Gum | 10 | 20-45 | 25-40 |
| Baking Soda | 1 | 2-10 | 2-7 |
| Brown Rice Syrup | 26 | 80-99 | 85-95 |
| Evaporated Cane Syrup | 24 | 80-95 | 85-95 |
| Oil | 12 | 30-70 | 35-60 |
| Water | 24 | 65-95 | 70-90 |
| Flavor | 0.6 | 0-4 | 1-6 |

TABLE 1-continued

| Ingredients | Example % | Broader Exemplary Ranges of Weight Proportions, % | Narrower Exemplary Range of Weight Proportions, % |
|---|---|---|---|
| Tocopherols | 0.1 | 0-2 | 0.5-1 |
| Salt | 0.1 | 0-2 | 0.5-1 |

*Processed pea flour as prepared in Example 1.

The food product above was prepared by a method comprising the steps of: (1) mix the acacia gum and baking soda with water using high shear; (2) add brown rice syrup and evaporated cane syrup into the previous mix with high shear; (3) add oil and tocopherol into the mix; (4) heat the resulting mixture to over 200° F., and (5) add the flavors and spices to the slurry mixture to form the syrup mix. Next, mix all the dry ingredients together. The syrup mix is then blended with the dry mix. The blended composition is then deposited onto or over a conveyer belt and through an oven to be baked.

Example 3

In accordance with some embodiments, the bitterness of a processed pea protein was evaluated by sensory analysis. A panel was trained to evaluate the bitterness intensity.

Figure 2:
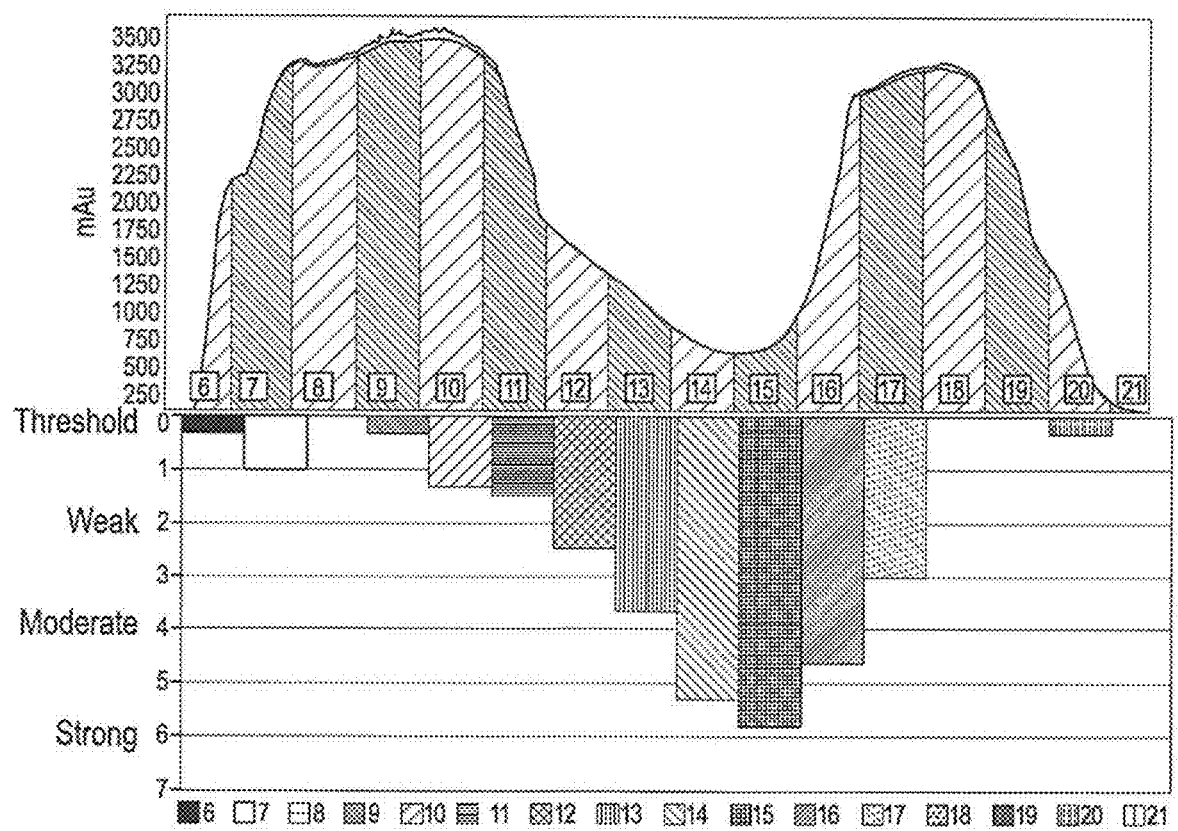
FIG. 2 is a graph showing taste data obtained across the test samples of a sensory screening for bitter fractions in pea protein sample fractionated by GPC.

Five panelists, three females and two males; performed the sensory testing. A line scale test was used to measure bitterness intensity (2, 5, and 10) for blind samples and blind standards. Three testing sessions were performed using the three point bitterness intensity scale (2, 5, and 10) for blind, standard, and six test samples. FIG. 1 shows the overall observed bitterness intensity score for raw pea protein, steam cooked pea protein, and steam cooked and drum dried peas protein. FIG. 2 shows the data obtained across the test samples.

Example 4

The concentration of soyasaponins in unprocessed and processed pea proteins, such as pea protein flour, based on the disclosure herein was conducted. Table 2 below provides the results. This Example evaluated the levels of free and bound soyasaponins in unprocessed and processed pea protein flours based on the methods herein. As discussed above, soyasaponins are believed to be the largest class of saponins in pea compositions. It is also believed that the remainder of saponin compounds in the processed materials will be reduced by the processing herein in a similar manner as that shown in Table 2 below.

The procedure for extraction and determination of free and bound soyasaponin is as follows: First the free soyasaponins and the bound soyasoponins are extracted. Free soyasaponin levels are determined by first grinding the sample and then extracting with methanol using Vortexing and sonication, followed by centrifugation. The supernatant is filtered before analysis. Total soyasaponin levels are determined by first grinding the sample and then treating with a dilute acid solution (such as 1N HCL) to hydrolyze any saponins bound to larger molecules. After hydrolysis, the mixture is neutralized and the hydrolysate is removed. The sample is then extracted with methanol, and the methanol extract and hydrolysate are combined and treated as above. Bound soyasaponins are calculated by taking the difference between the total and the free soyasaponins. The soyasaponins are determined using LC/MS/MS with an external calibration curve. The HPLC is performed using a "polar embedded phase" C18 column with a mobile phase gradient (50:50 A/B to 25:75 A/B), where mobile phase A is water+5% methanol containing 0.1% formic acid, and mobile phase B is acetonitrile containing 0.1% formic acid. Ionization is by pneumatically assisted electrospray in the negative ion detection mode.

TABLE 2

Saponin analysis

| Sample | Total Soyasaponin (ppm) | Free Soyasaponin (ppm) | Bound Soyasaponin (ppm) |
|---|---|---|---|
| unprocessed enriched pea protein flour | 581.9 | 124.3 | 457.6 |
| processed enriched pea protein flour | 490.8 | 459.4 | 31.5 |

As discussed above, it is believed that the bound saponins are associated with the undesired bitter tastes and pea flavors in the pea compositions and the methods herein dramatically reduce the levels of bound saponins. As shown in Table 2 above, the processing methods herein do not necessarily remove the amounts of free saponins and, rather, dramatically increase the levels of the free saponins. However, it was also unexpected that even with the large increase in free saponins, the processed pea compositions of the methods herein demonstrate a dramatic decrease in bitterness and pea flavors, which are believed to be associated with the levels of bound saponins in the pea compositions.

The following description is merely exemplary in nature and is not intended to limit the present disclosure, application, or uses. The aspects and embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure. The above definitions and non-limiting guidelines must be considered in reviewing the description of the technology set forth herein.

The headings (such as "Technical Field," "Background," and "Summary of the Disclosure") and sub-headings used herein are intended only for general organization of topics within the present technology, and are not intended to limit the scope of the disclosure of the present technology or any aspect thereof. In particular, subject matter disclosed in the "Background" may include novel technology and may not constitute a recitation of prior art. Subject matter disclosed in the "Summary of the Disclosure" is not an exhaustive or complete disclosure of the entire scope of the technology and is not intended to be used to limit the range of the subject matter that is disclosed herein. Any recitation in the "Abstract" of this application is not intended to be used to construe the scope of the claims or to limit the scope of the subject matter that is disclosed herein. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the "Background" is intended merely to provide a general summary of assertions made by the authors of the references, and does not constitute an admission as to the accuracy of the content of such references. Any references cited in the "Detailed Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made, or tested. Any use of the past tense to describe an example that may otherwise be indicated as constructive or prophetic is not intended to reflect that the constructive or prophetic example has actually been carried out.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Applicants reserve the right to proviso out any selection, group, element, or aspect, for example, to limit the scope of any claim to account for a prior disclosure of which Applicants may be unaware.

What is claimed is:

1. A deflavored pea composition comprising:
   protein, but no more than about 60 weight percent protein; and
   about 10 to about 150 ppm of bound saponins associated with compounds having a molecular weight of about 25 kDa to about 50 kDa;
   about 10 to about 1500 ppm of total saponins including the bound saponins and free saponins;
   a molecular weight distribution that is substantially free of proteins having a molecular weight of greater than about 25 kDa;
   wherein the deflavored pea composition has substantially no pea flavor or bitter tastes;
   wherein the deflavored pea composition is made by a process that includes steam cooking a raw pea slurry having about 10 to about 33 weight percent solids to form a cooked pea slurry and then drum drying the cooked pea slurry to form the deflavored pea composition; and
   wherein the step of steam cooking is at a temperature of about 150° F. to about 300° F., a time of about 30 seconds to about 10 minutes, and a back pressure of about 5 psi to about 60 psi;
   wherein the step of drum drying the cooked pea slurry is at a temperature of 100 to 280° F. for 2 minutes to 15 minutes.

2. The deflavored pea composition of claim 1, wherein the protein content is in an amount of about 25 percent to about 40 percent by weight of the deflavored pea composition.

3. The deflavored pea composition of claim 1, wherein the bound saponins are reduced by about 50 percent to about 95 percent as compared to an unprocessed pea composition.

4. The deflavored pea composition of claim 1 further comprising: one of a pea flour, a pea protein concentrate, pea protein isolates, and combinations thereof.

5. A pea flour compositions comprising:
   protein, but no more than about 60 weight percent protein;
   about 10 to about 150 ppm of bound saponins associated with protein having a molecular weight of about 25 kDa to about 50 kDa;
   about 110 to about 1400 ppm of free saponins not bound to protein;
   about 10 to about 1500 ppm of total saponins including the bound saponins and the free saponins; and
   a molecular weight distribution that is substantially free of proteins having a molecular weight of greater than about 25 kDa.

6. The pea flour composition of claim 5, wherein the pea flour composition includes 30 to 50 ppm of the bound saponins, about 200 to about 460 ppm of the free saponins, and about 300 to about 500 ppm of the total saponins.

* * * * *